(12) United States Patent
Manevich et al.

(10) Patent No.: US 11,706,014 B1
(45) Date of Patent: Jul. 18, 2023

(54) CLOCK SYNCHRONIZATION LOOP

(71) Applicant: MELLANOX TECHNOLOGIES, LTD., Yokneam (IL)

(72) Inventors: Natan Manevich, Ramat Hasharon (IL); Dotan David Levi, Kiryat Motzkin (IL); Wojciech Wasko, Mlynek (PL); Ariel Almog, Kohav Yair (IL); Bar Shapira, Tel-Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/579,630

(22) Filed: Jan. 20, 2022

(51) Int. Cl.
*H04L 7/00* (2006.01)

(52) U.S. Cl.
CPC .................. *H04L 7/0012* (2013.01)

(58) Field of Classification Search
CPC ... H04L 7/0012; H04L 63/1416; H04J 3/0688
USPC .......... 375/356, 371, 373, 375, 376
See application file for complete search history.

(56) References Cited

U.S. PATENT DOCUMENTS

| | | | |
|---|---|---|---|
| 5,392,421 A | 2/1995 | Lennartsson | |
| 5,402,394 A | 3/1995 | Turski | |
| 5,416,808 A | 5/1995 | Witsaman et al. | |
| 5,491,792 A | 2/1996 | Grisham et al. | |
| 5,564,285 A | 10/1996 | Jurewicz et al. | |
| 5,592,486 A | 1/1997 | Lo et al. | |
| 5,896,524 A | 4/1999 | Halstead, Jr. et al. | |
| 6,055,246 A | 4/2000 | Jones | |
| 6,084,856 A | 7/2000 | Simmons et al. | |
| 6,144,714 A | 11/2000 | Bleiweiss et al. | |
| 6,199,169 B1 | 3/2001 | Voth | |
| 6,289,023 B1 | 9/2001 | Dowling et al. | |
| 6,449,291 B1 | 9/2002 | Burns et al. | |
| 6,535,926 B1 | 3/2003 | Esker | |
| 6,556,638 B1 | 4/2003 | Blackburn | |
| 6,718,476 B1 * | 4/2004 | Shima .................. | H04J 3/0688 713/400 |
| 6,918,049 B2 | 7/2005 | Lamb et al. | |
| 7,111,184 B2 | 9/2006 | Thomas, Jr. et al. | |
| 7,191,354 B2 | 3/2007 | Purho | |
| 7,245,627 B2 | 7/2007 | Goldenberg et al. | |
| 7,254,646 B2 | 8/2007 | Aguilera et al. | |

(Continued)

FOREIGN PATENT DOCUMENTS

| | | |
|---|---|---|
| CN | 106817183 A | 6/2017 |
| CN | 108829493 A | 11/2018 |

(Continued)

OTHER PUBLICATIONS

Ipclock, "IEEE 1588 Primer," ip-clock.com, pp. 1-3, May 1, 2017 (downloaded from https://web.archive.org/web/20170501192647/http://ip-clock.com/ieee-1588-primer/).

(Continued)

*Primary Examiner* — Phuong Phu
(74) *Attorney, Agent, or Firm* — Kligler & Associates Patent Attorneys Ltd

(57) ABSTRACT

In one embodiment, a synchronized communication system includes a plurality of compute nodes, and clock connections to connect the compute nodes in a closed loop configuration, wherein the compute nodes are configured to distribute among the compute nodes a master clock frequency from any selected one of the compute nodes.

26 Claims, 6 Drawing Sheets

(56) References Cited

U.S. PATENT DOCUMENTS

| | | |
|---|---|---|
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 3,065,052 A1 | 11/2011 | Fredriksson et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,979,998 B1 | 5/2018 | Pogue et al. |
| 10,014,937 B1* | 7/2018 | Di Mola ............ H04L 63/1416 |
| 10,027,601 B2 | 7/2018 | Narkis et al. |
| 10,054,977 B2 | 8/2018 | Mikhaylov et al. |
| 10,164,759 B1 | 12/2018 | Volpe |
| 10,320,646 B2 | 6/2019 | Mirsky et al. |
| 10,637,776 B2 | 4/2020 | Iwasaki |
| 10,727,966 B1 | 7/2020 | Izenberg et al. |
| 11,070,304 B1 | 7/2021 | Levi et al. |
| 2001/0006500 A1 | 7/2001 | Nakajima et al. |
| 2002/0027886 A1 | 3/2002 | Fischer et al. |
| 2002/0031199 A1* | 3/2002 | Rolston ................ H04J 3/0685 370/258 |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0076319 A1 | 3/2012 | Terwal |
| 2012/0301134 A1 | 11/2012 | Davari et al. |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinelli et al. |
| 2015/0078405 A1 | 3/2015 | Roberts |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0072602 A1 | 3/2016 | Earl et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0315756 A1 | 10/2016 | Tenea et al. |
| 2017/0005903 A1 | 1/2017 | Mirsky |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2022/0021393 A1 | 1/2022 | Ravid et al. |
| 2022/0066978 A1 | 3/2022 | Mishra et al. |
| 2022/0239549 A1 | 7/2022 | Zhao et al. |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

U.S. Appl. No. 16/900,931 Office Action dated Apr. 28, 2022.
U.S. Appl. No. 16/683,309 Office Action dated Mar. 17, 2022.
U.S. Appl. No. 16/779,611 Office Action dated Mar. 17, 2022.
U.S. Appl. No. 17/120,313 Office Action dated Mar. 28, 2022.
U.S. Appl. No. 17/191,736 Office Action dated Apr. 26, 2022.
EP Application # 21214269.9 Search Report dated May 2, 2022.
U.S. Appl. No. 17/148,605 Office Action dated May 17, 2022.
EP Application #22151451.6 Search Report dated Jun. 17, 2022.
U.S. Appl. No. 16/779,611 Office Action dated Jun. 24, 2022.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
U.S. Appl. No. 17/120,313 Office Action dated Aug. 29, 2022.
ITU-T Standard G.8262/Y.1362, "Timing characteristics of synchronous equipment slave clock", pp. 1-44, Nov. 2018.

(56) References Cited

OTHER PUBLICATIONS

ITU-T Standard G.8264/Y.1364, "Distribution of timing information through packet networks", pp. 1-42, Aug. 2017.
ITU-T Standard G.8261/Y.1361, "Timing and synchronization aspects in packet networks", pp. 1-120, Aug. 2019.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.eom/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
Levi et al., U.S. Appl. No. 17/120,313, filed Dec. 14, 2020.
Mula et al., U.S. Appl. No. 17/148,605, filed Jan. 14, 2021.
Levy et al., U.S. Appl. No. 17/313,026, filed May 6, 2021.
U.S. Appl. No. 17/191,736 Office Action dated Nov. 10, 2022.
U.S. Appl. No. 17/670,540 Office Action dated Jan. 18, 2023.
U.S. Appl. No. 17/191,736 Advisory Action dated Feb. 16, 2023.
U.S. Appl. No. 17/549,949 Office Action dated Mar. 30, 2023.

* cited by examiner

CLOCK SYNCHRONIZATION LOOP

FIELD OF THE INVENTION

The present invention relates to computer systems, and in particular, but not exclusively to, clock synchronization.

BACKGROUND

Clock and frequency synchronization among network devices is used in many network applications. One application of using a synchronized clock value is for measuring latency between two devices. If the clocks are not synchronized the resulting latency measurement will be inaccurate.

Synchronous Ethernet (SyncE) is an International Telecommunication Union Telecommunication (ITU-T) Standardization Sector standard for computer networking that facilitates the transference of clock signals over the Ethernet physical layer. In particular, SyncE enables clock synchronization inside a network with respect to a master clock. Each network element (e.g., a switch, a network interface card (NIC), or router) needs to recover the master clock from high-speed data received from the master device clock source and use the recovered master clock for its own data transmission in a manner such that the master clock spreads throughout the network. SyncE provides synchronization with respect to clock frequency. The actual clock value (e.g., in Coordinated Universal Time (UTC) format) is handled by higher layer standards and protocols, such as Precision Time Protocol (PTP).

Time, clock and frequency synchronization is crucial in some of the modern computer network applications. It enables 5G and 6G networks, and is proven to enhance the performance of data center workloads. The SyncE standard allows improving Precision Time Protocol (PTP) accuracy by having less accumulated drift between PTP messages, and helps achieve an accurate time solution for an extended period after completely losing a PTP source.

SUMMARY

There is also provided in accordance with still another embodiment of the present disclosure, a synchronized communication system, including a plurality of compute nodes, and clock connections to connect the compute nodes in a closed loop configuration, wherein the compute nodes are configured to distribute among the compute nodes a master clock frequency from any selected one of the compute nodes.

Further in accordance with an embodiment of the present disclosure, the system includes a controller to selectively block and unblock distribution of the master clock frequency in the closed loop responsively to one of the compute nodes being designated as a master clock.

Still further in accordance with an embodiment of the present disclosure the compute nodes include at least one of the following a data processing unit (DPU), graphics processing unit (GPU), switch, network interface controller.

Additionally in accordance with an embodiment of the present disclosure each of the compute nodes includes one or more ports to transmit and receive respective communication signals over respective network links, andclock synchronization circuitry to process at least one of the respective communication signals received by the one or more ports so as to recover a respective remote clock.

Moreover in accordance with an embodiment of the present disclosure each of the compute nodes includes clock synchronization circuitry to recover a remote clock, a clock input port connected to another clock output port of a first one of the compute nodes via a first one of the clock connections, and configured to receive a clock signal at the master clock frequency from the first compute node, and a clock output port connected to another clock input port of a second one of the compute nodes via a second one of the clock connections.

Further in accordance with an embodiment of the present disclosure the first compute node and the second compute node are a same one of the compute nodes.

Still further in accordance with an embodiment of the present disclosure the clock synchronization circuitry is configured to discipline a local clock signal to the master clock frequency responsively to the recovered respective remote clock, or the received clock signal, and output the disciplined local clock signal via the clock output port to the second compute node.

Additionally in accordance with an embodiment of the present disclosure the clock synchronization circuitry includes a frequency synthesizer.

Moreover, in accordance with an embodiment of the present disclosure the frequency synthesizer is a frequency jitter synchronizer.

Further in accordance with an embodiment of the present disclosure the frequency synthesizer is a jitter network synchronizer clock.

Still further in accordance with an embodiment of the present disclosure the clock synchronization circuitry is configured to discipline a local clock signal to the master clock frequency responsively to the recovered respective remote clock, and output the disciplined local clock signal via the clock output port to the second compute node.

Additionally in accordance with an embodiment of the present disclosure the clock synchronization circuitry is configured to ignore the clock signal received by the clock input port.

Moreover, in accordance with an embodiment of the present disclosure, the system includes a controller to selectively block distribution of the master clock frequency in the closed loop by instructing the clock synchronization circuitry to ignore the clock signal received by the clock input port responsively to one of the compute nodes being designated as a master clock.

Further in accordance with an embodiment of the present disclosure the clock synchronization circuitry is configured to discipline a local clock signal to the master clock frequency responsively to the received clock signal, and output the disciplined local clock signal via the clock output port to the second compute node.

Still further in accordance with an embodiment of the present disclosure the compute nodes are configured to distribute the master clock frequency via respective ones of the clock connections using at least one of a one pulse per second (PPS) signal, or a 10 mega Hertz (10 MHz) signal.

There is also provided in accordance with still another embodiment of the present disclosure, a synchronized communication method, including connecting compute nodes with clock connections in a closed loop configuration, and distributing among the compute nodes a master clock frequency from any selected one of the compute nodes.

Additionally in accordance with an embodiment of the present disclosure, the method includes selectively blocking and unblocking distribution of the master clock frequency in the closed loop responsively to one of the compute nodes being designated as a master clock.

Moreover, in accordance with an embodiment of the present disclosure the compute nodes include at least one of the following a data processing unit (DPU), graphics processing unit (GPU), switch, network interface controller.

Further in accordance with an embodiment of the present disclosure, the method includes recovering a remote clock, connecting a clock input port to another clock output port of a first one of the compute nodes via a first one of the clock connections, receiving a clock signal at the master clock frequency from the first compute node, and connecting a clock output port to another clock input port of a second one of the compute nodes via a second one of the clock connections.

Still further in accordance with an embodiment of the present disclosure the first compute node and the second compute node are a same one of the compute nodes.

Additionally in accordance with an embodiment of the present disclosure, the method includes disciplining a local clock signal to the master clock frequency responsively to the recovered respective remote clock, or the received clock signal, and outputting the disciplined local clock signal via the clock output port to the second compute node.

Moreover, in accordance with an embodiment of the present disclosure, the method includes disciplining a local clock signal to the master clock frequency responsively to the recovered respective remote clock, and outputting the disciplined local clock signal via the clock output port to the second compute node.

Further in accordance with an embodiment of the present disclosure, the method includes ignoring the clock signal received by the clock input port.

Still further in accordance with an embodiment of the present disclosure, the method includes selectively blocking distribution of the master clock frequency in the closed loop by instructing clock synchronization circuitry to ignore the clock signal received by the clock input port responsively to one of the compute nodes being designated as a master clock.

Additionally in accordance with an embodiment of the present disclosure, the method includes disciplining a local clock signal to the master clock frequency responsively to the received clock signal, and outputting the disciplined local clock signal via the clock output port to the second compute node.

Moreover, in accordance with an embodiment of the present disclosure, the method includes distributing the master clock frequency via respective ones of the clock connections using at least one of a one pulse per second (PPS) signal, or a 10 mega Hertz (10 MHz) signal.

BRIEF DESCRIPTION OF THE DRAWINGS

The present invention will be understood from the following detailed description, taken in conjunction with the drawings in which.

DESCRIPTION OF EXAMPLE EMBODIMENTS

Figure 1:
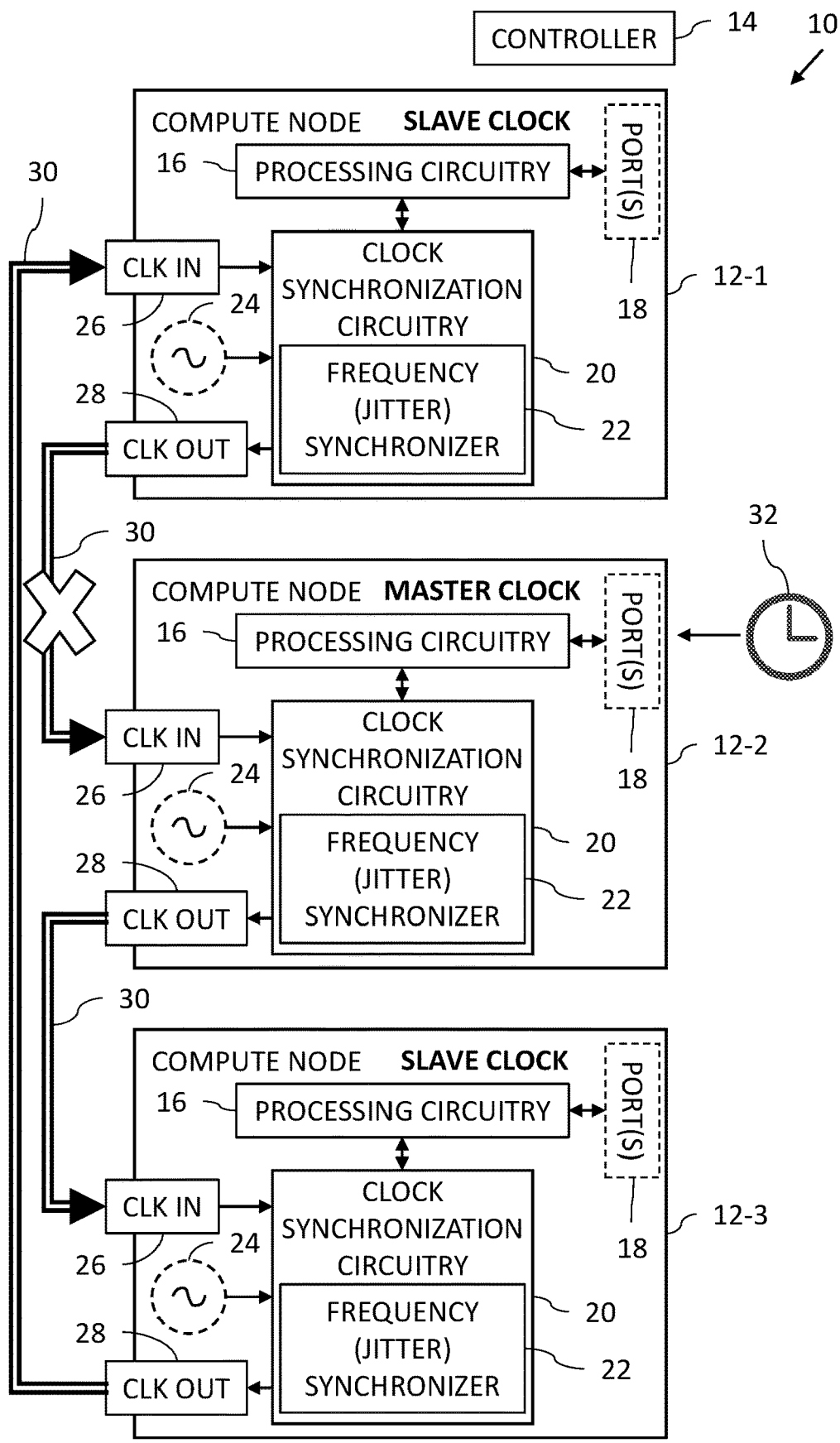
FIG. 1 is a block diagram view of a clock synchronization system with one compute node designated as a master clock constructed and operative in accordance with an embodiment of the present invention.

Clock synchronization between compute nodes remains an unsolved challenge in the networking industry. One solution is to use SyncE clock chaining by chaining multiple SyncE capable devices together so that the master clock is distributed from one compute node at the root of the chain to other compute nodes in the chain. The root is defined by wiring topology.

SyncE clock chaining may have some limitations including imposing a local clock hierarchy that is dictated by the physical wiring, introducing a possible "single point of failure" since the root controls the frequency of the entire chain. For example, if the compute node at the root malfunctions, it then becomes impossible to distribute the clock among the remaining compute nodes. Therefore, if the master clock moves to another of the compute nodes, the master clock cannot be distributed based on the physical wiring.

One solution to the above problems is to transfer information regarding frequency differences between the root and the new master clock via some centralized entity, such as a SyncE software daemon running on a central processing unit (CPU). However, this solution adds complexity to the software—hardware/firmware interfaces, and to the software itself, and may add inaccuracies to the timing solution due to latencies and jitter of the control messages exchanged between the devices and the managing software. Additionally, this solution may add CPU load due to exchanging messages and performing calculations. It should be noted that CPU utilization is extremely important in 5G use cases where SyncE is commonly required.

Embodiments of the present invention, solve at least some of the above problems by connecting compute nodes using clock connections to connect the compute nodes in a closed loop configuration. For example, compute node 1 is connected to compute node 2, which is connected to compute node 3, which is connected to compute node 1, forming a closed loop. The closed loop may then be used to distribute a master clock frequency among the compute nodes from any selected one of the compute nodes in the closed loop by passing the master clock frequency from compute node to compute node in the closed loop. For example, if one of the compute nodes is designated as a master clock, the master clock frequency is distributed from the compute node designated as the master clock to the other compute nodes via the clock connections of the closed loop. If at a later time another one of the compute nodes is designated as the master clock (for example, due to the previous compute node designated as a master malfunctioning), the master clock frequency is distributed from the compute node of the newly designated master clock to the other compute nodes via the clock connections of the closed loop. Therefore, if one of the compute nodes malfunctions, it is still possible to operate another one of the compute nodes to distribute the master clock frequency.

In some embodiments, a clock output port of one compute node is connected to the clock input port of another compute node with a cable or other connection (e.g., a trace on a circuit board), and so on, until all the compute nodes are connected together in a closed loop. For example, the clock output port of node 1 is connected to the clock input port of node 2, and so on. The clock output port of node 3 is connected to the clock input port of node 1, thereby completing the loop. Upon detecting a clock signal at its clock input port, a compute node in the closed loop uses the received clock signal to discipline its local clock signal. The received clock signal may then be output via the clock output port of that compute node to the next compute node in the chain, and so on.

In some embodiments, the compute node designated as the master clock should not use a clock signal received from another compute node to discipline its local clock signal. Instead, the compute node designated as the master clock disciplines its local clock signal from a recovered remote clock. It is this recovered remote clock which is distributed around the loop to the other compute nodes. In some embodiments, software or firmware running on a controller breaks the chain of the closed loop so that the compute node designated as the master clock does not use a clock signal received via its clock input port. Therefore, software or firmware may instruct the compute node designated as the master clock to ignore the received clock signal at its clock input port and by default use the recovered remote clock to discipline its local clock signal. In other embodiments, software or firmware running on a controller breaks the chain of the closed loop so that the compute node designated as the master clock does not receive a clock signal via its clock input port. Therefore, in some embodiments, the software or firmware running on the controller may instruct the compute node, which would otherwise pass its clock via its clock output port to the compute node of the designated master clock, to not output a clock signal to the compute node of the designated master clock.

Each of the compute nodes may include clock synchronization circuitry which performs at least some of the following: recovering a remote clock and disciplining a local clock signal based on the recovered remote clock, receiving the clock signal via the chain, disciplining the local clock signal based on the received clock signal, and passing the local clock signal to the next compute node in the chain. The clock synchronization circuitry may include a frequency jitter synchronizer, for example, a low or ultra-low frequency jitter synchronizer. An example of a suitable frequency synthesizer is Ultra-Low Jitter Network Synchronizer Clock LMK05318 commercially available from Texas Instruments Inc., 12500 TI Boulevard Dallas, Tex. 75243 U.S.A..

SYSTEM DESCRIPTION

Reference is now made to FIG. 1, which is a block diagram view of a clock synchronization system 10 with one compute node 12-2 designated as a master clock constructed and operative in accordance with an embodiment of the present invention. The system 10 includes a plurality of compute nodes 12 (labeled compute nodes 12-1, 12-2, 12-3), and a controller 14. Each compute node 12 may include processing circuitry 16, one or more ports 18, clock synchronization circuitry 20 (which optionally includes a frequency synchronizer 22), an oscillator 24, a clock input port 26, and a clock output port 28.

A plurality of clock connections 30 are configured to connect the compute nodes 12 in a closed loop configuration. For example, compute node 12-1 is connected to compute node 12-2, which is connected to compute node 12-3, which in turn is connected to compute node 12-1 via the clock connections 30 as described in more detail below.

FIG. 1 shows three compute nodes 12 connected together in a closed loop configuration. The system 10 may include two compute nodes 12 connected together in a closed loop configuration, described in more detail with reference to FIG. 5. The system 10 may include more than three compute nodes 12 connected together in a closed loop configuration. The compute nodes 12 may be disposed on the same printed circuit board (not shown) with the clock connections 30 being implemented using printed circuit board (PCB) traces (not shown) on the circuit board between the compute nodes 12.

The processing circuitry 16 may include hardwired processing circuitry and/or one or more processors on which to execute software. The software may be downloaded to the compute node 12 or disposed on the compute node 12 at manufacture. The processing circuitry 16 may include packet processing circuitry which may include a physical layer (PHY) chip and MAC chip (not shown). The processing circuitry 16 may include switching circuitry, and/or a data processing unit (DPU) and/or graphics processing unit (GPU) or any suitable processor, described in more detail with reference to FIG. 6.

The port(s) 18 are configured to transmit and receive respective communication signals over respective network links, for example, to receive a clock synchronization signal or clock synchronization packets from a remote clock 32. The clock synchronization signal or clock synchronization packets may be received via any suitable interface via any suitable communication method and protocol.

The clock input port 26 of one of the compute nodes 12 (e.g., compute node 12-1) is connected to the clock output port 28 of another one of the compute nodes 12 (e.g., compute node 12-3) via one of the clock connections 30, and configured to receive a clock signal at the master clock frequency from the other compute node 12 (e.g., compute node 12-3). The clock output port 28 of one of the compute nodes 12 (e.g., compute node 12-1) is connected to the clock input port 26 of another one of the compute nodes 12 (e.g., compute node 12-2) via one of the clock connections 30. The clock output port 28 of the compute node 12-2 is connected to the clock input port 26 of the compute node 12-3 via one of the clock connections 30.

In general, the compute nodes 12 are configured to distribute among the compute nodes 12 a master clock frequency from any selected one of the compute nodes, for example, the computer node 12-2 designated as the master clock.

In the example of FIG. 1, the compute node 12-2 disciplines its local clock signal from the remote clock 32 and is designated as the master clock, for example by the controller 14. The compute node 12-2 distributes its local clock signal as the master clock frequency via the clock output port 28 of compute node 12-2 to the clock input port 26 of compute node 12-3. The compute node 12-3 disciplines its local clock signal responsively to the received clock signal received at the clock input port 26 of compute node 12-3. The compute node 12-3 distributes its local clock signal as the master clock frequency via the clock output port 28 of compute node 12-3 to the clock input port 26 of compute node 12-1. The compute node 12-1 disciplines its local clock signal responsively to the received clock signal received at the clock input port 26 of compute node 12-1. In some embodiments, the compute node 12-1 is instructed by the controller 14 not to distribute its local clock signal via the clock output port 28 of compute node 12-1. In other embodiments, the compute node 12-1 distributes its local clock signal as the master clock frequency via the clock output port 28 of compute node 12-1 to the clock input port 26 of compute node 12-2, which is instructed by the controller 14 to ignore the received clock signal received at the clock input port 26 of compute node 12-2.

The compute nodes 12 may be configured to distribute the master clock frequency via respective clock connections 30 in the form of any signal which is scaled proportional to master clock frequency using one pulse per second (PPS) signal(s) or 10 mega Hertz (10 MHz) signal(s). The scaling factor may be used by the clock synchronization circuitry 20 of the outputting compute node 12 to scale the master clock frequency to one PPS or 10 MHz, for example, and by the clock synchronization circuitry 20 of the receiving compute node 12 to rebuild the received signal (e.g., one PPS or 10 MHz) to the master clock frequency.

In some embodiments, the frequency synchronizer 22 is a frequency jitter synchronizer or a jitter network synchronizer clock. The frequency synchronizer 22 may be configured to tune a network frequency, feed the clock of the compute node 12, and provide phase lock loop (PLL) capabilities. In some embodiments, the frequency synchronizer 22 include an application-specific integrated circuit (ASIC) and/or a programmable device with analog circuitry mainly for phase lock loop (PLL) capabilities. The frequency synchronizer 22 may be a low or ultra-low frequency jitter synchronizer. An example of a suitable frequency synthesizer is Ultra-Low Jitter Network Synchronizer Clock LMK05318 commercially available from Texas Instruments Inc., 12500 TI Boulevard, Dallas, Tex. 75243 U.S.A..

In the compute node 12-2 designated as the master clock, the frequency synchronizer 22 adjusts the output of the oscillator 24 to provide a local clock signal based on a clock recovered from the remote clock 32. In the compute node(s) 12-1, 12-3 not designated as the master clock, the clock signal received at the clock input port 26 is used by the frequency synchronizer 22 to drive the local clock signal, generally without using the output of the oscillator 24.

In some embodiments, the frequency synchronizer 22 is configured to use the clock signal received at the clock input port 26 if such a clock signal is received. If not, the frequency synchronizer 22 disciplines the local clock signal based on the output of the oscillator 24 and/or a recovered remote clock. Therefore, in some embodiments, software or firmware running on the controller 14 breaks the chain of the closed loop so that the compute node 12-2 designated as the master clock does not use a clock signal received at its clock input port 26 or does not receive a clock signal at its clock input port 26, as described in more detail with reference to FIG. 3.

When the compute nodes 12 boot up, each compute node 12 looks for a clock signal being received at its own clock input port 26 and if a clock signal is not found, the respective compute node 12 uses a local clock, for example, based on an output of the oscillator 24 in that compute node 12. Therefore, the first compute node 12 to boot up outputs a clock signal based on a local clock from its clock output port 28 to the next compute node 12 in the closed loop. The next compute node 12 then detects the clock signal input via its clock input port 26 and uses the received clock signal to discipline its local clock signal, and so on. When one of the compute nodes 12 is designated as a master clock, that compute node 12 does not use the clock signal received at its clock input port 26, but disciplines its local clock signal based on the remote clock 32 and outputs its local clock signal via its clock output port 28 to the next compute node 12 in the loop, and so on. Another option is to assign one of the compute nodes 12 as a default master clock.

Figure 2:
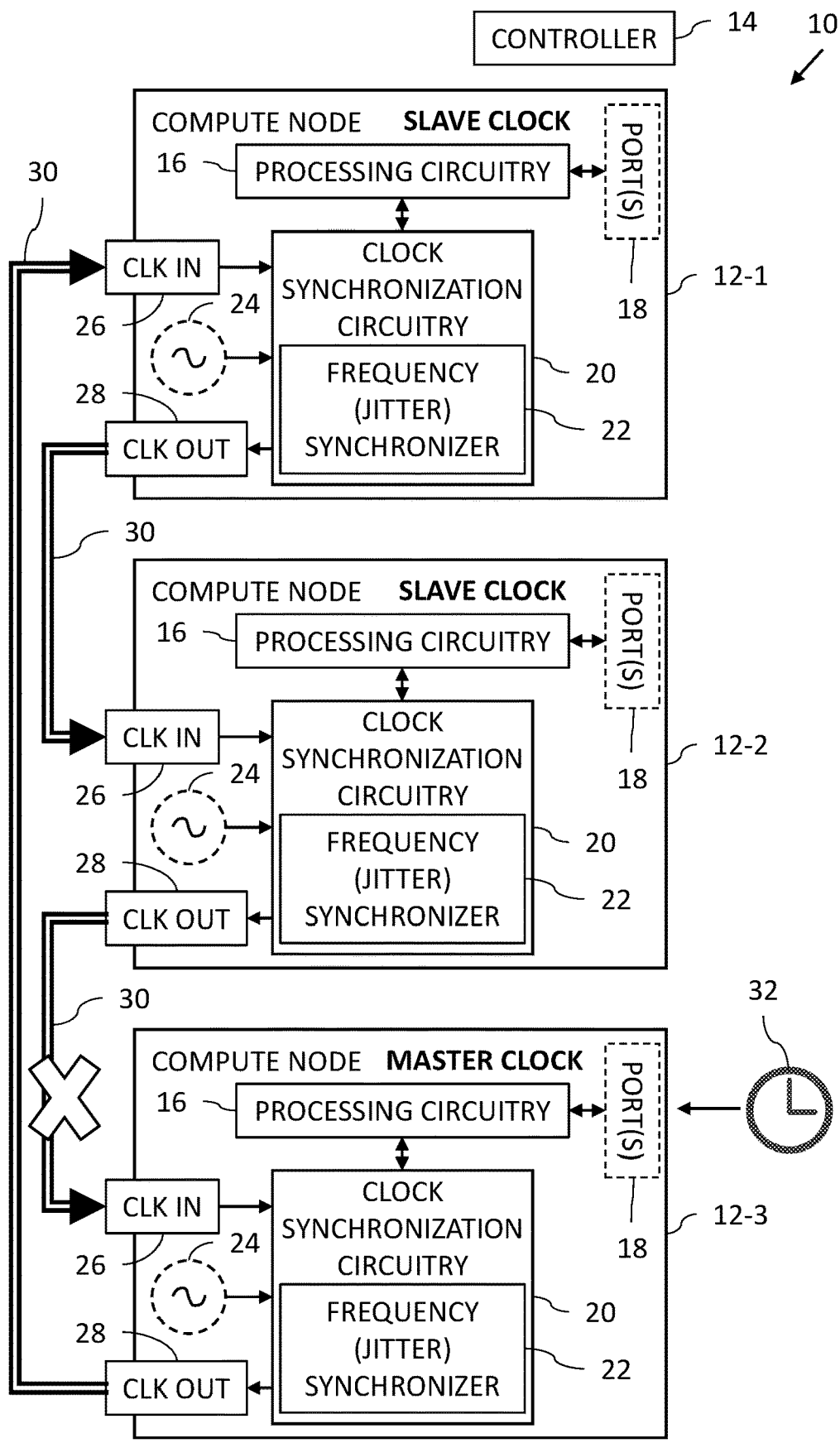
FIG. 2 is a block diagram view of the clock synchronization system of FIG. 1 with another compute node designated as the master clock.

Reference is now made to FIG. 2, which is a block diagram view of the clock synchronization system of FIG. 1 with compute node 12-3 designated as the master clock. The master clock may be moved from one compute node 12 to another due to many reasons, for example, the remote clock 32 used by one of the compute nodes 12 previously designated as the master clock may now be non-functional or deemed to be less accurate than a remote clock used by another one of the compute nodes 12 now designated as the master clock.

In the example of FIG. 2, the compute node 12-3 is now designated as the master clock (for example, by the controller 14), and disciplines its local clock signal from the remote clock 32. The compute node 12-3 may: ignore any clock signal received at its clock input port 26; or the controller 14 may instruct the compute node 12-2 to cease outputting the local clock signal of compute node 12-2 via the clock output port 28 of compute node 12-2. The compute node 12-3 distributes its local clock signal as the master clock frequency via the clock output port 28 of compute node 12-3 to the clock input port 26 of the compute node 12-1. The compute node 12-1 disciplines its local clock signal responsively to the received clock signal received at the clock input port 26 of compute node 12-1. The compute node 12-1 distributes its local clock signal as the master clock frequency via the clock output port 28 of compute node 12-1 to the clock input port 26 of compute node 12-2. The compute node 12-2 disciplines its local clock signal responsively to the received clock signal received at the clock input port 26 of compute node 12-2. As mentioned above, in some embodiments, the compute node 12-2 is instructed by the controller 14 not to distribute its local clock signal via the clock output port 28 of compute node 12-2. In other embodiments, the compute node 12-2 distributes its local clock signal as the master clock frequency via the clock output port 28 of compute node 12-2 to the clock input port 26 of compute node 12-3, which is instructed by the controller 14 to ignore the received clock signal received at the clock input port 26 of compute node 12-3.

Figure 3:
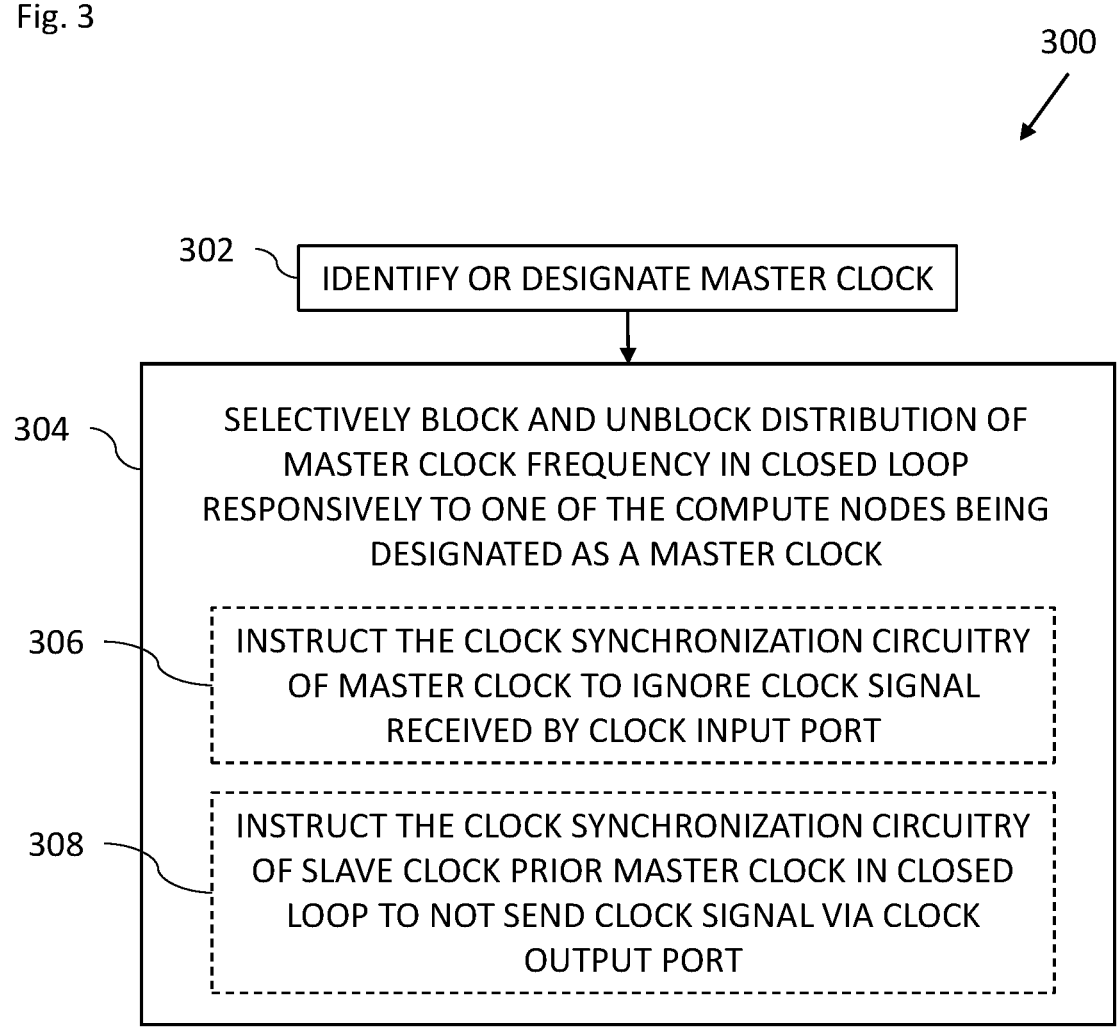
FIG. 3 is a flowchart including steps in a method of operation of a controller of the system of FIG. 1.

Reference is now made to FIG. 3, which is a flowchart 300 including steps in a method of operation of the controller 14 of the system 10 of FIG. 1.

In some embodiments, the controller 14 is configured to run a software daemon which knows the topology of the system 10 (i.e., how the compute nodes 12 are connected in the closed loop) and which compute node 12 is the master clock (e.g., SyncE master) so that the software daemon knows where to block and unblock the closed loop. If the compute nodes 12 are disposed in different hosts, then the hosts may need to communicate with respect to blocking and unblocking the closed loop.

The controller 14 is configured to identify or designate one of the compute nodes 12 as the master clock (block 302). The controller 14 is configured to selectively block and unblock distribution of the master clock frequency in the closed loop responsively to one of the compute nodes 12 being designated as a master clock (block 304). In some embodiments, the controller 14 is configured to instruct the clock synchronization circuitry 20 of the compute node 12 designated as the master clock to ignore the clock signal received at its clock input port 26 responsively to that compute node 12 being designated as the master clock (block 306). In other embodiments, the controller 14 is configured to instruct the clock synchronization circuitry 20 of the compute node 12 (designated as a slave clock prior and) located immediately prior to the compute node 12 designated as the master clock in the closed loop to not send its local clock signal via its clock output port 28 to the compute node 12 designated as the master clock (block 308).

In practice, some or all of the functions of the controller 14 may be combined in a single physical component or, alternatively, implemented using multiple physical components. These physical components may comprise hard-wired or programmable devices, or a combination of the two. In some embodiments, at least some of the functions of the controller 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 4:
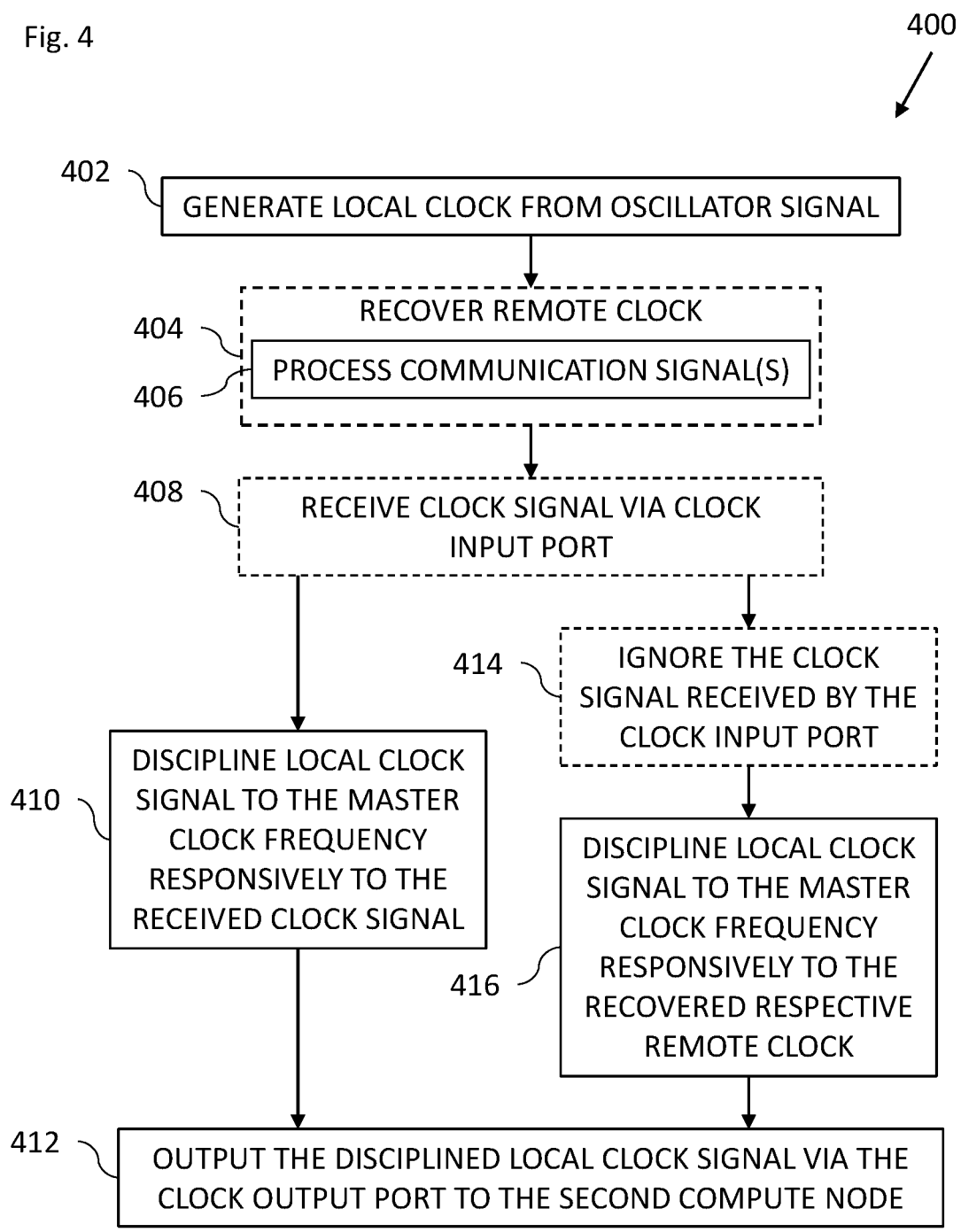
FIG. 4 is a flowchart including steps in a method of operation of clock synchronization circuitry in a compute node in the system of FIG. 1.

Reference is now made to FIG. 4, which is a flowchart 400 including steps in a method of operation of the clock synchronization circuitry 20 in one of the compute nodes 12 (e.g., compute node 12-3) in the system 10 of FIG. 1.

The flowchart 400 is first traversed assuming that the compute node 12-3 is designated as a slave clock.

When the compute node 12-3 first boots up, the clock synchronization circuitry 20 of the compute node 12-3 is configured to generate a local clock signal responsively to an output from the oscillator 24 (block 402). After a short delay, assuming there is still no clock signal received by the clock input port 26 of the compute node 12-3, the clock synchronization circuitry 20 of the compute node 12-3 is configured to recover a remote clock, e.g., from the remote clock 32 (block 404). The step of block 404 may include the clock synchronization circuitry 20 being configured to process respective communication signal(s) received by the respective port(s) 18 so as to recover a respective remote clock (block 406). The clock synchronization circuitry 20 of the compute node 12-3 is configured to receive a clock signal via the clock input port 26 of the compute node 12-3 (block 408) from the previous compute node 12-2 in the closed loop. The clock synchronization circuitry 20 of the compute node 12-3 is configured to discipline its local clock signal to the master clock frequency responsively to the received clock signal (block 410). The clock synchronization circuitry 20 of the compute node 12-3 is configured to output the disciplined local clock signal via the clock output port 28 of the compute node 12-3 to the next compute node 12-1 in the closed loop (block 412).

The flowchart 400 is now traversed assuming that the compute node 12-3 is now designated as a master clock.

One or more of the steps of blocks 402-408 may be performed. If a clock signal is received by the clock synchronization circuitry 20 of the compute node 12-3 via the clock input port 26 of compute node 12-3, the clock synchronization circuitry 20 of the compute node 12-3 is configured to ignore the clock signal received by the clock input port 26 (block 414). The clock synchronization circuitry 20 of compute node 12-3 is configured to discipline the local clock signal of compute node 12-3 to the master clock frequency responsively to the recovered remote clock (recovered in the step of blocks 404 and/or 406) (block 416). The clock synchronization circuitry 20 of the compute node 12-3 is then configured to perform the step of block 412.

In practice, some or all of the functions of the clock synchronization circuitry 20 may be combined in a single physical component or, alternatively, implemented using multiple physical components. These physical components may comprise hard-wired or programmable devices, or a combination of the two. In some embodiments, at least some of the functions of the clock synchronization circuitry 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 5:
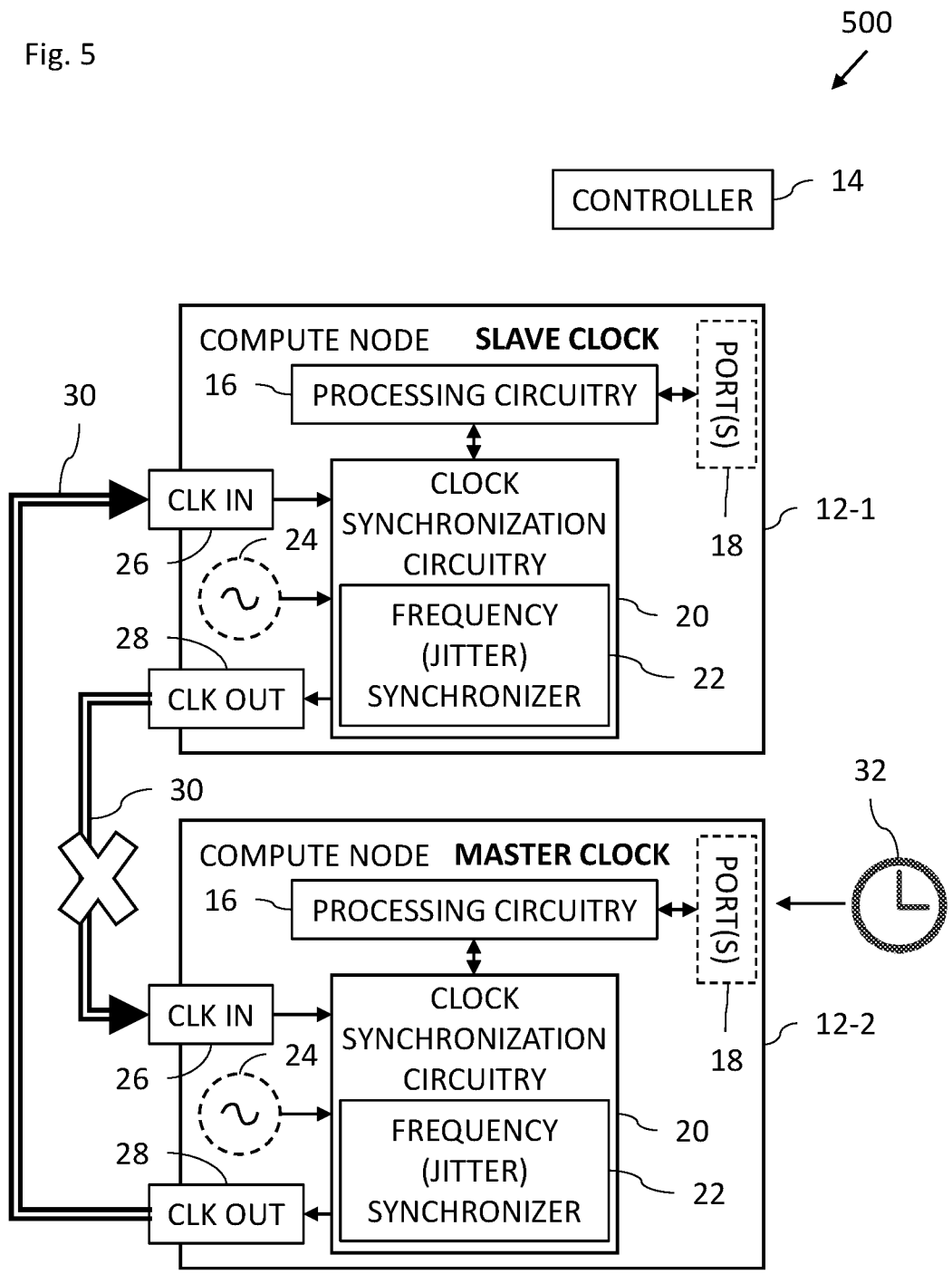
FIG. 5 is a block diagram view of a clock synchronization system with two compute nodes constructed and operative in accordance with an alternative embodiment of the present invention.

Reference is now made to FIG. 5, which is a block diagram view of a clock synchronization system 500 with two compute nodes 12 constructed and operative in accordance with an alternative embodiment of the present invention.

The clock synchronization system 500 is substantially the same as the system 10 except that in the clock synchronization system 500 there are only two computes node 12. The clock synchronization system 500 may be compared to combining compute nodes 12-1, 12-3 of system 10 into the same compute node 12-1, which is in a closed loop with the compute node 12-2.

In the clock synchronization system 500, the clock output port 28 of compute node 12-1 is connected to the clock input port 26 of compute node 12-2 via one of the clock connections 30, and the clock output port 28 of compute node 12-2 is connected to the clock input port 26 of compute node 12-1 via one of the clock connections 30 thereby forming the closed loop.

Figure 6:
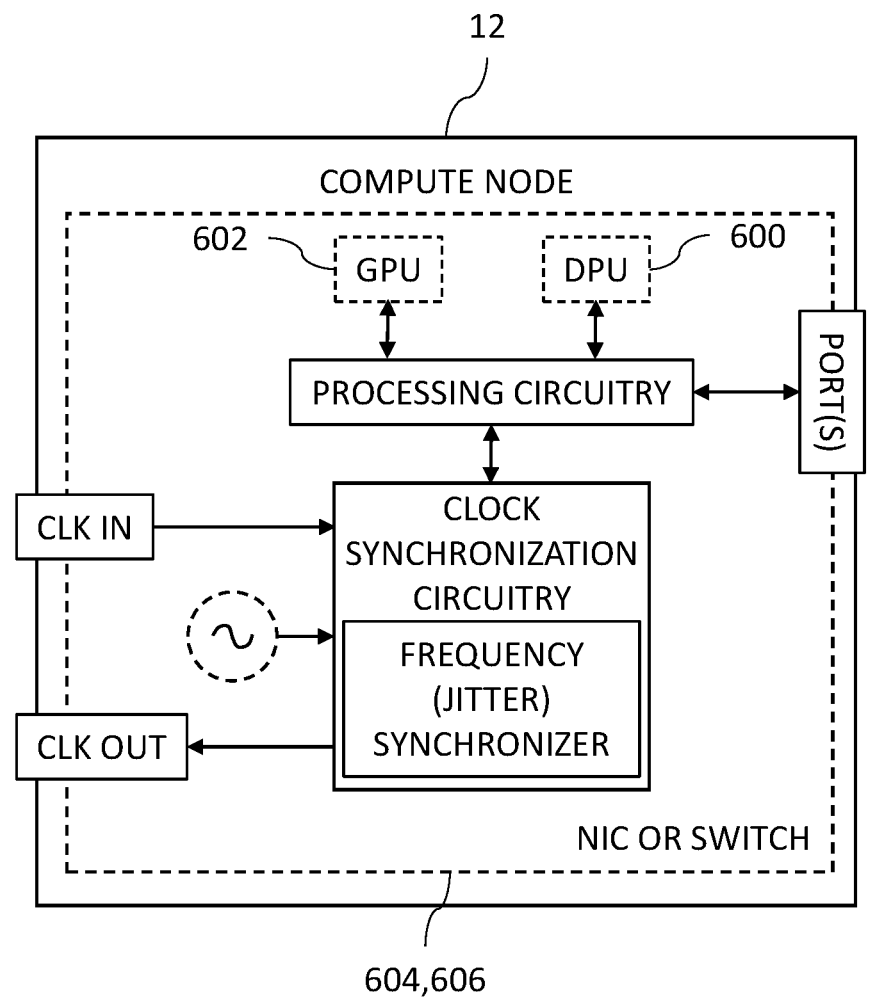
FIG. 6 is a more detailed block diagram view of a compute node in the system of FIG. 1.

Reference is now made to FIG. 6, which is a more detailed block diagram view of one of the compute nodes 12 in the system 10 of FIG. 1. The compute node 12 may include any one or more of the following: a data processing unit (DPU) 600, a graphics processing unit (GPU) 602, a switch 604, or a network interface controller (NIC) 606.

Graphics processing units (GPUs) are employed to generate three-dimensional (3D) graphics objects and two-dimensional (2D) graphics objects for a variety of applications, including feature films, computer games, virtual reality (VR) and augmented reality (AR) experiences, mechanical design, and/or the like. A modern GPU includes texture processing hardware to generate the surface appearance, referred to herein as the "surface texture," for 3D objects in a 3D graphics scene. The texture processing hardware applies the surface appearance to a 3D object by "wrapping" the appropriate surface texture around the 3D object. This process of generating and applying surface textures to 3D objects results in a highly realistic appearance for those 3D objects in the 3D graphics scene.

The texture processing hardware is configured to perform a variety of texture-related instructions, including texture operations and texture loads. The texture processing hardware generates accesses texture information by generating memory references, referred to herein as "queries," to a texture memory. The texture processing hardware retrieves surface texture information from the texture memory under varying circumstances, such as while rendering object surfaces in a 3D graphics scene for display on a display device, while rendering 2D graphics scene, or during compute operations.

Surface texture information includes texture elements (referred to herein as "texels") used to texture or shade object surfaces in a 3D graphics scene. The texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

In general, a texture operation involves querying multiple texels around a particular point of interest in 3D space, and then performing various filtering and interpolation operations to determine a final color at the point of interest. By contrast, a texture load typically queries a single texel, and returns that directly to the user application for further processing. Because filtering and interpolating operations typically involve querying four or more texels per processing thread, the texture processing hardware is conventionally built to accommodate generating multiple queries per thread. For example, the texture processing hardware could be built to accommodate up to four texture memory queries is performed in a single memory cycle. In that manner, the texture processing hardware is able to query and receive most or all of the needed texture information in one memory cycle.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A synchronized communication system, comprising:
a plurality of compute nodes including a first compute node, one or more intermediate compute nodes, and a last compute node; and
clock connections to connect the compute nodes in a closed loop configuration, wherein:
each of the compute nodes has an output connected to an input of a next one of the compute nodes via a respective one of the clock connections, while the last compute node has an output connected to an input of the first compute node via another respective one of the clock connections;
the compute nodes are configured to distribute among the compute nodes, via ones of the clock connections, a master clock frequency from any selected one of the compute nodes, which is designated as a master clock;
at a first time one of the plurality of compute nodes is designated as the master clock and is configured to distribute the master clock frequency among the compute nodes; and
at a second time another one of the plurality of compute nodes is designated as the master clock, and is configured to distribute the master clock frequency among the compute nodes.

2. The system according to claim 1, further comprising a controller to selectively block and unblock distribution of the master clock frequency in the closed loop responsively to one of the compute nodes being designated as a master clock.

3. The system according to claim 1, wherein the compute nodes include at least one of the following: a data processing unit (DPU), graphics processing unit (GPU), switch, network interface controller.

4. The system according to claim 1, wherein each of the compute nodes comprises:
one or more ports to transmit and receive respective communication signals over respective network links; and
clock synchronization circuitry to process at least one of the respective communication signals received by the one or more ports so as to recover a respective remote clock.

5. The system according to claim 1, wherein the first compute node comprises:
clock synchronization circuitry to recover a remote clock;
a clock input port connected to a clock output port of a third compute node of the plurality of compute nodes via a first one of the clock connections, and configured to receive a clock signal at the master clock frequency from the third compute node; and
a clock output port connected to a clock input port of a second compute node of the plurality of compute nodes via a second one of the clock connections.

6. The system according to claim 5, wherein the third compute node and the second compute node are a same one of the compute nodes.

7. The system according to claim 5, wherein the clock synchronization circuitry is configured to:
discipline a local clock signal to the master clock frequency responsively to: the recovered respective remote clock; or the received clock signal; and
output the disciplined local clock signal via the clock output port to the second compute node.

8. The system according to claim 7, wherein the clock synchronization circuitry comprises a frequency synthesizer.

9. The system according to claim 8, wherein the frequency synthesizer is a frequency jitter synchronizer.

10. The system according to claim 8, wherein the frequency synthesizer is a jitter network synchronizer clock.

11. The system according to claim 5, wherein the clock synchronization circuitry is configured to:
discipline a local clock signal to the master clock frequency responsively to the recovered respective remote clock; and
output the disciplined local clock signal via the clock output port to the second compute node.

12. The system according to claim 11, wherein the clock synchronization circuitry is configured to ignore the clock signal received by the clock input port.

13. The system according to claim 12, further comprising a controller to selectively block distribution of the master clock frequency in the closed loop by instructing the clock synchronization circuitry to ignore the clock signal received by the clock input port responsively to one of the compute nodes being designated as a master clock.

14. The system according to claim 5, wherein the clock synchronization circuitry is configured to:
discipline a local clock signal to the master clock frequency responsively to the received clock signal; and
output the disciplined local clock signal via the clock output port to the second compute node.

15. The system according to claim 1, wherein the compute nodes are configured to distribute the master clock frequency via respective ones of the clock connections using at least one of: a one pulse per second (PPS) signal; or a 10 mega Hertz (10 MHz) signal.

16. A synchronized communication method, comprising:
  connecting compute nodes including a first compute node, one or more intermediate compute nodes, and a last compute node, with clock connections in a closed loop configuration so that each of the compute nodes has an output connected to an input of a next one of the compute nodes via a respective one of the clock connections, while the last compute node has an output connected to an input of the first compute node via another respective one of the clock connections;
  distributing among the compute nodes, via ones of the clock connections, a master clock frequency from any selected one of the compute nodes, which is designated as a master clock;
  at a first time, designating one of the plurality of compute nodes as the master clock and distributing the master clock frequency among the compute nodes; and
  at a second time, designating another one of the plurality of compute nodes as the master clock, and distributing the master clock frequency among the compute nodes.

17. The method according to claim 16, further comprising selectively blocking and unblocking distribution of the master clock frequency in the closed loop responsively to one of the compute nodes being designated as a master clock.

18. The method according to claim 16, wherein the compute nodes include at least one of the following: a data processing unit (DPU), graphics processing unit (GPU), switch, network interface controller.

19. The method according to claim 16, further comprising:
  recovering a remote clock;
  connecting a clock input port to a clock output port of a third compute node of the plurality of compute nodes via a first one of the clock connections;
  receiving a clock signal at the master clock frequency from the third compute node; and
  connecting a clock output port to a clock input port of a second compute node of the plurality of compute nodes via a second one of the clock connections.

20. The method according to claim 19, wherein the third compute node and the second compute node are a same one of the compute nodes.

21. The method according to claim 19, further comprising:
  disciplining a local clock signal to the master clock frequency responsively to: the recovered respective remote clock; or the received clock signal; and
  outputting the disciplined local clock signal via the clock output port to the second compute node.

22. The method according to claim 19, further comprising:
  disciplining a local clock signal to the master clock frequency responsively to the recovered respective remote clock; and
  outputting the disciplined local clock signal via the clock output port to the second compute node.

23. The method according to claim 22, further comprising ignoring the clock signal received by the clock input port.

24. The method according to claim 23, further comprising selectively blocking distribution of the master clock frequency in the closed loop by instructing clock synchronization circuitry to ignore the clock signal received by the clock input port responsively to one of the compute nodes being designated as a master clock.

25. The method according to claim 19, further comprising:
  disciplining a local clock signal to the master clock frequency responsively to the received clock signal; and
  outputting the disciplined local clock signal via the clock output port to the second compute node.

26. The method according to claim 16, further comprising distributing the master clock frequency via respective ones of the clock connections using at least one of: a one pulse per second (PPS) signal; or a 10 mega Hertz (10 MHz) signal.

* * * * *